March 9, 1965

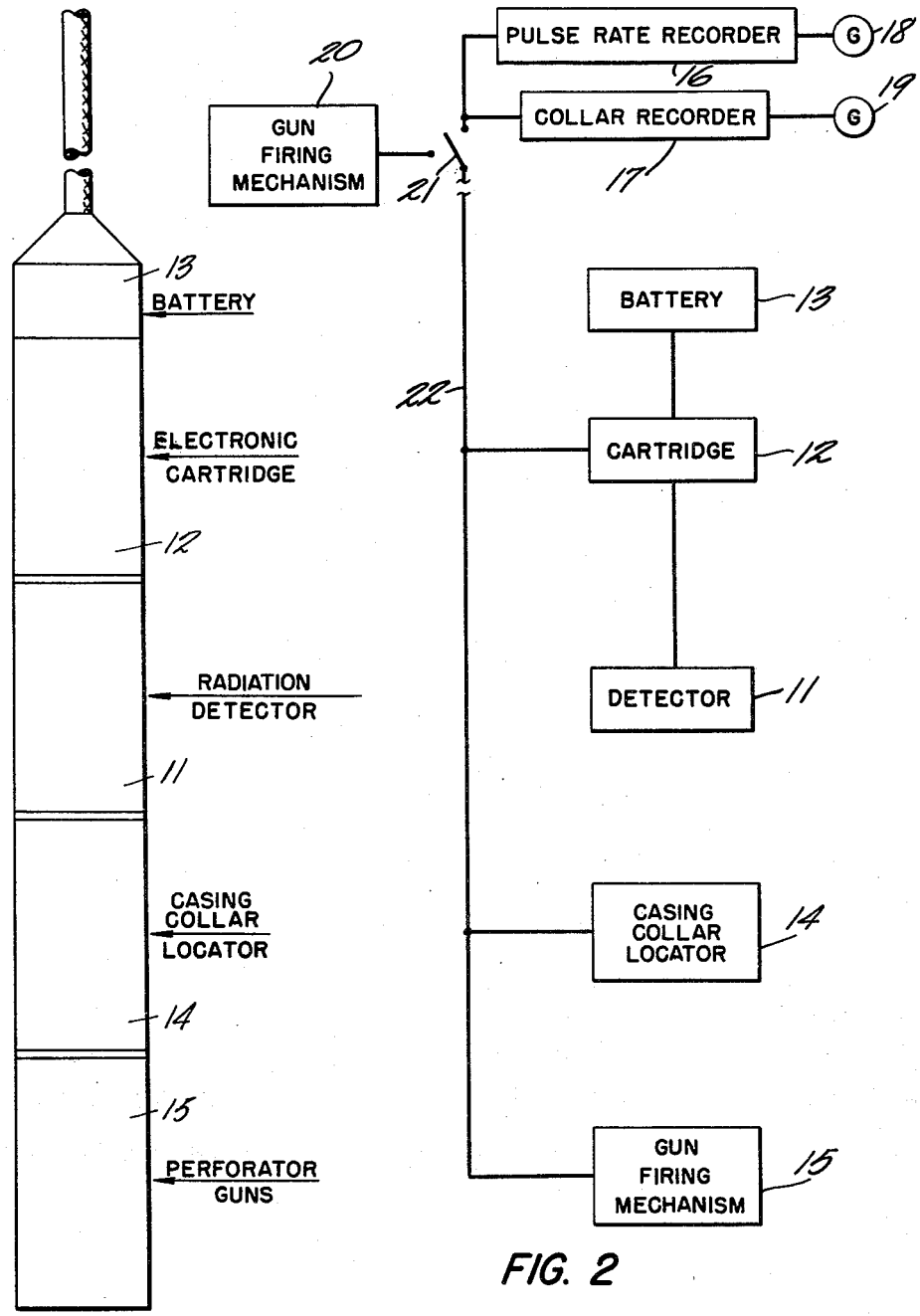

J. T. DEWAN 3,172,360

WELL LOGGING APPARATUS

Filed Nov. 9, 1959

INVENTOR.
JOHN T. DEWAN

BY his ATTORNEYS

United States Patent Office 3,172,360
Patented Mar. 9, 1965

3,172,360
WELL LOGGING APPARATUS
John T. Dewan, Houston, Tex., assignor to Schlumberger Well Surveying Corporation, Houston, Tex., a corporation of Texas
Filed Nov. 9, 1959, Ser. No. 851,857
1 Claim. (Cl. 102—20)

This invention relates to a well logging apparatus and, more particularly, to a well logging apparatus made up of several components that include unique safety features which enable the components to be operated on a single cable conductor without danger of power being accidentally applied to an improper component.

Many operations involving a number of electrical elements that are coupled together must be carried out using a single cable conductor, or a monocable, due to space and insulating requirements. This is particularly true in geophysical well logging operations where a logging tool may consist of three or four different elements which are connected to a single conductor that extends to the surface of the earth. The elements are coupled together in order to decrease the logging time and to reduce the possibility of errors in depth measurement in a bore.

It has been found that certain types of elements coupled together on a monocable in a conventional manner have been dangerous because one element can accidentally apply power to another element and cause considerable damage. This is particularly true in well logging operations where a perforating gun and a radiation detecting system are used in combination and share a monocable, since the power transmitted from the surface to operate the detecting system might easily trigger the gun.

It is, therefore, an object of this invention to provide a well logging apparatus made up of several elements which can be operated effectively on a monocable without danger of one element accidentally triggering another element.

These and other advantages are attained by providing a well logging apparatus which includes at least a subsurface radiation detecting apparatus and a casing perforating gun all connected by a monocable to a recorder for the detecting apparatus at the surface of the ground. The detecting apparatus has a self contained power supply which is prevented from contacting the monocable and the recorder is capable of operating without a source of power, so that there is no danger of these elements accidentally energizing the perforating guns. Other safety features are incorporated into the logging apparatus as will be explained more fully in the detailed description.

This invention can be better understood from the following detailed description of a representative embodiment of the invention taken in conjunction with the accompanying figures of the drawings, in which:

FIGURE 1 illustrates a geophysical well logging apparatus constructed in accordance with the invention;

FIGURE 2 is a schematic illustration of the electrical connections to the components included in the well logging apparatus shown in FIGURE 1;

Figure 3:
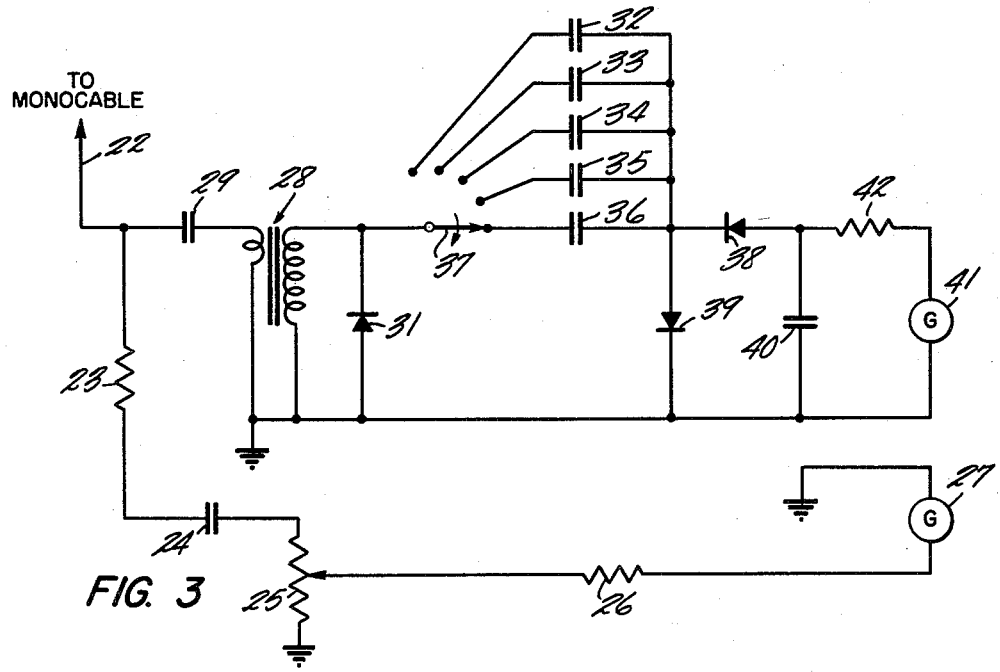
FIGURE 3 is a schematic diagram of a passive pulse rate recorder constructed in accordance with the invention.

The geophysical well logging apparatus illustrated in FIGURE 1 may include, for example, a radiation detecting apparatus, an electronic cartridge and a battery, a casing collar locator and a casing perforating gun. The detecting apparatus gives certain information on the types of earth formations surrounding a bore while the collar locator indicates the depth of the deposits with respect to the casing collars and the perforating gun blasts holes in the side of the well casing so that the oil can enter. The three elements are lowered simultaneously into the well and are coupled together in order to decrease the logging time, for convenience and to increase the accuracy of perforation placement.

The electrical system for the logging tool is illustrated schematically in FIGURE 2 and includes an electronic cartridge 12 for amplifying and shaping the signals received from a radiation detector 11 and a battery 13 that supplies power to the cartridge and the detector. The detector may, for example, be a Geiger-Muller counter that generates a signal each time a gamma-ray photon energizes it, or it may be a scintillation detector. The electronic cartridge 12 amplifies and shapes the signal prior to transmission to the surface by way of a monocable 22. At the surface of the ground, a novel pulse rate recording system 16 constructed in accordance with the invention receives the signals and indicates the rate at which they are received on a galvanometer 18.

A collar locator 14 is connected, also via the monocable 22, to a collar recorder 17 which passes a signal to a galvanometer 19 each time the locator passes a casing joint. A gun firing mechanism 20 at the surface is connected to the firing mechanism 15 in the bore by way of a switch 21 and the monocable 22.

FIGURE 3 is a schematic diagram of a novel recording apparatus adapted to record the information received from the logging tool. The collar recorder 17, which is responsive to the signals from the casing collar locator 14, includes a resistor 23, a coupling capacitor 24, a sensitivity control 25, a limiting resistor 26 and a very sensitive galvanometer 27. The casing collar locator 14 mounted in the logging tool is a conventional type which generates a signal each time a casing collar changes the reluctance of its magnetic circuit.

The passive pulse rate recorder 16 for the detecting apparatus is a passive unit which includes a step-up transformer 28 that has its primary winding connected to the monocable 22 through a coupling capacitor 29 and has its secondary winding connected across a silicon zener diode 31. The properties of the diode 31 are such that its ohmic resistance in the reverse direction is very high at voltages less than its breakdown voltage, but, above this voltage, its resistance is reduced to almost zero. A plurality of capacitors 32 to 36, which may be selectively switched into the circuit by a switch 37, provide for an adjustment of the galvanometer sensitivity as will be explained more fully hereinafter. The capacitors 32 to 36 are connected in series with a germanium diode 39 which has a tank capacitor 40 and a germanium diode 38 connected across it. The rate at which the pulses are received by the recorder is indicated on a track by a galvanometer 41 which is connected in series with a resistor 42.

In operation, pulses from the cartridge 12 are carried to the surface of the ground by the monocable 22 and are impressed across the primary winding of the transformer 28. The voltage appearing across the secondary winding of the transformer 28 causes current to flow through a circuit that includes the switch 37, a selected one of the capacitors 32–36 and the diode 39. The amplitude of each pulse is clipped to a standard value by the diode 31 so that each pulse places an equal amount of charge on the selected one of capacitors 32–36. At the end of each incoming pulse, the selected one of capacitors 32–36 discharges into the tank capacitor 40 through the switch 37, the secondary winding of the transformer 28, the tank capacitor 40, and the diode 38. Each incoming pulse, therefore, deposits an equal amount of charge on the tank capacitor 40 which causes current to flow through the galvanometer 41 via the resistor 42.

The deflection of the galvanometer 41 can be shown to be proportional to the pulse rate by the following computations. Assuming that the capacitors 32–36 are very much smaller than the tank capacitor 40, that R is very much greater than the resistance of the galvanometer, and that N·C·R is less than 0.1, then the voltage across the tank capacitor 40 will be given by the equation:

$$V_t = V \cdot N \cdot C \cdot R$$

where N is the pulse rate in pulses per second, V is the voltage to which the selected one of capacitors 32–36 is charged by each incoming pulse, C is the capacitance of the selected one of capacitors 32–36 in farads and R is the resistance 42 connected in series with the galvanometer 41. The current through the galvanometer is, therefore, equal to V·N·C which is directly proportional to the rate at which the gamma-ray pulses are received by the recording system. Since the galvanometer current is also proportional to the capacitance of the selected one of capacitors 32–36, the five different capacitors provide a means for varying the galvanometer sensitivity.

Figure 4:
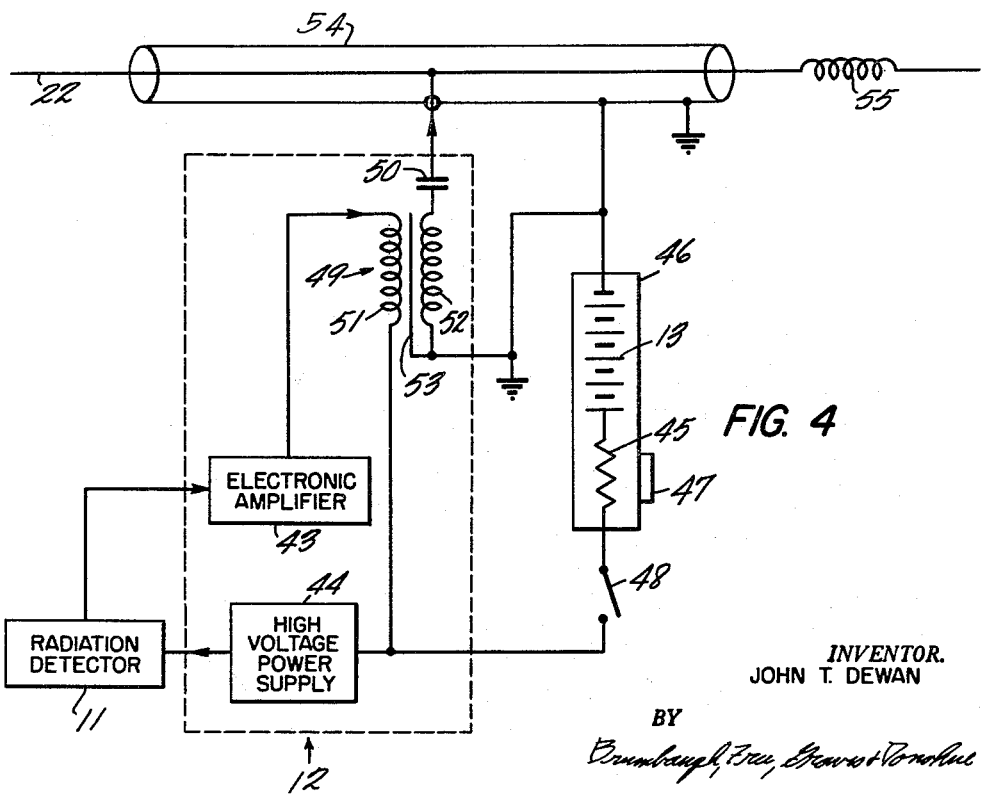
FIGURE 4 is a block diagram of a portion of the well logging apparatus shown in FIGURE 2.

FIGURE 4 is a block diagram of the portion of the down hole equipment that includes the battery 13, the radiation detector 11 and the electronic cartridge 12 which includes in part an amplifier 43 and a high voltage supply 44. This portion of the system has novel safety features incorporated into it to prevent an accidental firing of a perforating gun.

The structure illustrated in FIGURE 4 includes a battery 13 connected in series with a limiting resistor 45. The resistor is for the purpose of limiting the current flow to a value less than that which will detonate the perforating gun in the event of a short circuit to the monocable 22. The battery and the resistor are constructed in a sealed unit 46, and the unit 46 has a key portion 47 formed thereon so that it can be installed in the logging tool in only one way. Power is connected to the cartridge 12 components by a switch 48, such as a mercury switch, which closes only when the logging tool is in a nearly vertical position.

The voltage from the battery is applied to a high voltage oscillator type power supply 44, FIGURE 4, where the voltage is raised to a value where it will operate the radiation detector 11. A pulse generated when a gamma-ray photon energizes the detector 11 is fed to the electronic amplifier 43, which is powered by the battery 13, where it is amplified and then fed to the monocable 22 via a transformer 49 and a capacitor 50. The transformer is specially designed to isolate the battery 13 from the monocable 22. The primary and the secondary windings 51 and 52, respectively, of transformer 49 are separated from each other by a grounded, nonferrous, conducting shield 53. Thus, should the primary winding 51 short to the shield 53, it will short to ground and not to the circuit leading to the monocable 22. After leaving the secondary winding 52 of the transformer 49, the pulse is fed through the blocking capacitor 50 which is a second direct current safety device designed to isolate the monocable 22 from the battery 13 should the transformer 49 fail. After the capacitor 50, the pulse is fed to the monocable 22 and thence to the passive recorder illustrated in FIGURE 3.

As a further safety feature, the length of the monocable 22 that passes through the battery, electronic cartridge and detector sections is completely surrounded by a grounded shield 54 except where the connection is made to the capacitor 50. A choke 55 is connected in series with the monocable 22 and prevents the perforating gun firing circuit from short circuiting the output pulses from the cartridge 12 to ground.

It can be seen that the invention provides a novel well logging apparatus that comprises a plurality of different well tools all of which can be operated safely on one monocable. The danger of accidentally firing the casing perforating gun is eliminated by using a downhole source of electric energy to operate the detectors that is isolated from the monocable and by providing a recording apparatus that does not require a power source. In order for the downhole battery to short to the monocable, the isolating capacitor 50 and the output transformer 49 (FIGURE 4) would have to break down, and, even then, the limiting resistor 45 would keep the current below that required to fire the gun.

It will be apparent that certain features of the invention could be used in other applications. The passive pulse rate recorder, for example, could be used whenever a power source is not available or is not desirable.

While a representative embodiment of the present invention has been shown and described for purposes of illustration, it is apparent that changes and modifications may be made without departing from this invention in its broader aspects. Therefore, the invention described herein is not to be construed as limited to the specific embodiment described but is intended to encompass all modifications thereof coming within the scope of the following claim.

I claim:

An apparatus for investigating earth formations traversed by a bore comprising, a single cable conductor extending into said bore from the surface of the earth, a support adapted to be lowered into said bore on said conductor, detector means carried by said support for investigating characteristics of said earth formations and connected to supply an output of electrical pulses to said conductor, a limited direct current capacity electrical energy source for said detector means carried by said support, means for isolating the direct current produced by said source from said conductor, electrically actuated explosive means carried by said support and electrically coupled to said conductor, selectively operable means at the surface of the earth for supplying electrical energy through said conductor to said explosive means, capacitor means coupled to said conductor at the surface of the earth for receiving the pulses generated by said detector means, means connected to said capacitor means for limiting the voltage to which it will be charged so that said capacitor means is charged a fixed amount by each pulse received, additional capacitor means, means providing a discharge path from said first mentioned capacitor means into said additional capacitor means, and indicator means connected across said additional capacitor means for measuring the charge thereon, the two capacitor means and said indicator means being energized solely by energy from said output pulses, whereby no additional energy sources are required to provide an indication of the detected characteristics of the earth formations.

References Cited in the file of this patent

UNITED STATES PATENTS

| | | |
|---|---|---|
| 2,349,041 | Hare | May 16, 1944 |
| 2,631,671 | Krasnow et al. | Mar. 17, 1953 |
| 2,673,329 | Frommer | Mar. 23, 1954 |
| 2,732,518 | Bricaud | Jan. 24, 1956 |
| 2,879,403 | Rankin | Mar. 24, 1959 |
| 2,897,445 | Goodale | July 28, 1959 |
| 2,912,932 | Ayers | Nov. 17, 1959 |
| 2,922,889 | Hall | Jan. 26, 1960 |
| 3,032,107 | Rumble et al. | May 1, 1962 |